US008565252B2

(12) United States Patent
Tsuji et al.

(10) Patent No.: US 8,565,252 B2
(45) Date of Patent: Oct. 22, 2013

(54) WIRELESS TRANSMISSION SYSTEM, DEVICE AND METHOD FOR EFFICIENTLY TRANSMITTING ASSOCIATED DATA

(75) Inventors: Keisuke Tsuji, Osaka (JP); Seiji Imanishi, Osaka (JP); Ryosuke Ohmae, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 199 days.

(21) Appl. No.: 13/131,888

(22) PCT Filed: Oct. 21, 2009

(86) PCT No.: PCT/JP2009/068102
§ 371 (c)(1),
(2), (4) Date: May 31, 2011

(87) PCT Pub. No.: WO2010/064499
PCT Pub. Date: Jun. 10, 2010

(65) Prior Publication Data
US 2011/0228715 A1    Sep. 22, 2011

(30) Foreign Application Priority Data

Dec. 1, 2008   (JP) .................................. 2008-306541

(51) Int. Cl.
*H04L 12/54*      (2013.01)
*H04L 1/00*       (2006.01)
*H04L 12/28*      (2006.01)
*H04W 4/00*       (2009.01)
*H04N 7/18*       (2006.01)

(52) U.S. Cl.
USPC ........... 370/428; 370/429; 370/235; 370/338; 370/412; 725/81

(58) Field of Classification Search
None
See application file for complete search history.

(56) References Cited

U.S. PATENT DOCUMENTS

2003/0223377 A1    12/2003   Simmons et al.
2006/0024025 A1    2/2006    Miyazawa et al.
(Continued)

FOREIGN PATENT DOCUMENTS

CN       1728807 A        2/2006
JP       2008-22560 A     1/2008
(Continued)

OTHER PUBLICATIONS

"International Search Report, dated Nov. 17, 2009, issued in PCT/JP2009/068102".

(Continued)

*Primary Examiner* — Yemane Mesfin
*Assistant Examiner* — Peter Chen
(74) *Attorney, Agent, or Firm* — Birch, Stewart, Kolasch & Birch, LLP

(57) ABSTRACT

Provided is a wireless transmission system which can transmit data accompanying video/audio by a different transmission method depending on the characteristic of the data in a wireless transmission environment where the transmission band is narrow and a transmission error is easily caused. The wireless transmission system includes: a wireless receiver (3) connected to a sink device (4); and a wireless transmitter (2) connected to a source device (1). A wireless communication is performed between the wireless receiver (3) and the wireless transmitter (2) so that video and audio are outputted from the source device (1) to the sink device (4). The wireless receiver (3) and/or the wireless transmitter (2) categorizes the data accompanying the video and the audio in accordance with the characteristic thereof and transmits the accompanying data by using a different transmission method depending on the categorization.

4 Claims, 5 Drawing Sheets

(56) References Cited

U.S. PATENT DOCUMENTS

| | | |
|---|---|---|
| 2006/0143335 A1 | 6/2006 | Ramamoorthy et al. |
| 2006/0209745 A1* | 9/2006 | MacMullan et al. .......... 370/328 |
| 2006/0209892 A1 | 9/2006 | MacMullan et al. |
| 2008/0212940 A1 | 9/2008 | Tan et al. |
| 2009/0178086 A1* | 7/2009 | Unger .............................. 725/81 |
| 2009/0210539 A1* | 8/2009 | Funabiki et al. .............. 709/228 |
| 2009/0260043 A1* | 10/2009 | Tatsuta et al. .................... 725/81 |
| 2009/0322948 A1 | 12/2009 | Funabiki et al. |
| 2010/0066906 A1 | 3/2010 | Nakajima |
| 2010/0165912 A1 | 7/2010 | Funabiki et al. |

FOREIGN PATENT DOCUMENTS

| | | |
|---|---|---|
| JP | 2008-35517 A | 2/2008 |
| JP | 2008-48137 A | 2/2008 |
| JP | 2008-113198 A | 5/2008 |
| JP | 2008-153728 A | 7/2008 |
| JP | 2008-283469 A | 11/2008 |
| RU | 2325765 C2 | 5/2003 |
| RU | 2 319 225 C1 | 5/2004 |
| WO | WO 2006/101801 A2 | 9/2006 |
| WO | WO 2007/037379 A1 | 4/2007 |
| WO | WO 2007/091706 A1 | 8/2007 |

OTHER PUBLICATIONS

Hitachi, Ltd. et al., "Supplement 1 Consumer Electronics Control (CEC)", High-Definition Multimedia Interface Specification Version 1.3a, Nov. 10, 2006, (104 pages).

Hitachi, Ltd. et al., High-Definition Multimedia interface Specification Version 1.3a, Nov. 10, 2006 (172 pages).

Supplementary European Search report for application No. 09830267.2, dated Oct. 25, 2012.

* cited by examiner

FIG.2

| | ASSOCIATED DATA | PROPERTY OF DATA | | TRANSMISSION MODE | |
|---|---|---|---|---|---|
| | | TRANSMISSION RATE | CERTAINTY OF TRANSMISSION (LOW, HIGH) | RETRANSMISSION | TRANSMISSION ORDER REARRANGEMENT |
| TYPE 1 | STATE INFORMATION OF VOLUME, AUDIO/VIDEO MUTE CONTROL, ETC. (DIP) | IMPORTANT | LOW | NO | NO |
| TYPE 2 | CEC MESSAGE (CEC), HDCP AUTHENTICATION MESSAGE, EDID (DDC) | NOT IMPORTANT | HIGH | YES | NO |
| TYPE 3 | VIDEO STATE INFORMATION SUCH AS VIDEO/AUDIO FORMAT INFORMATION, LIGHT CONTROL INFORMATION, AND COLOR CORRECTION (DIP), HOT PLUG SIGNAL (HPD) | NOT IMPORTANT | HIGH | YES | YES (OLD INFORMATION BEFORE CHANGE IN STATE REMAINING IN QUEUE IS DISCARDED) |

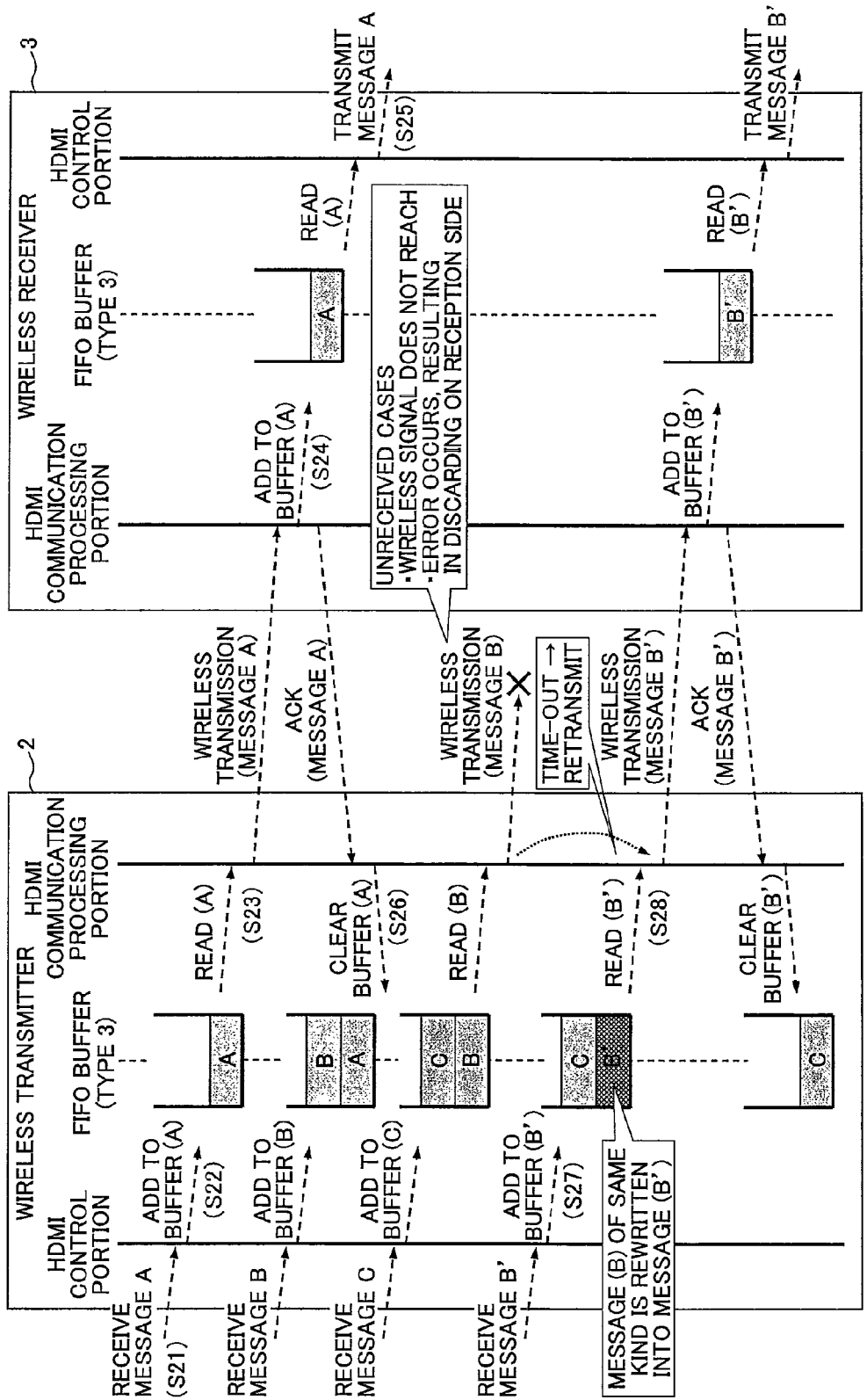

ized data are transmitted in the same transmission mode and, therefore, it is problematic that the efficiency deteriorates and that the associated data cannot correctly be transmitted if an amount of data to be transmitted increases or if a transmission error or data dropout occurs.

WIRELESS TRANSMISSION SYSTEM, DEVICE AND METHOD FOR EFFICIENTLY TRANSMITTING ASSOCIATED DATA

TECHNICAL FIELD

The present invention relates to a wireless transmission system, and, more particularly, to a wireless transmission system for wirelessly connecting devices compatible with the HDMI standard, etc., to each other.

BACKGROUND ART

Digital interfaces of the HDMI standard are widely used as those for transmission of video/audio, etc. The HDMI standard is arranged for AV (Audio Visual) devices by adding an audio transmission function and a copyright protection function to the DVI (Digital Visual Interface) standard which is a digital connection standard between a computer and a display. In the case of the HDMI standard, image (video) data/audio data are transmitted in a mode called TMDS (Transition Minimized Differential Signaling).

The prescription of CEC has been added to the HDMI standards since Version 1.2a (see, e.g., "Supplement 1 Consumer Electronics Control (CEC)" of Nonpatent document 1). This CEC protocol is a control protocol that performs control between devices connected through an HDMI cable. The CEC protocol enables various controls based on unique physical and logical addresses assigned to devices present on an HDMI network. For example, if a user plays back an HDMI-connected DVD (Digital Versatile Disc) player when watching digital broadcasting on a television apparatus, the television apparatus automatically switches input terminal from broadcast receiving terminal to a terminal connected to the DVD player by itself. A menu manipulation displayed by the DVD player, power-on/off, etc., can be performed using a remote controller of the television apparatus.

Terms related to CEC are defined in Nonpatent document 1; those having an HDMI input terminal are defined as sink devices; and those having an HDMI output terminal to output an AV stream are defined as source devices. Those defined as repeater devices have the HDMI input terminal and output terminal to input/output an AV stream and behave as both the sink device and the source device. The sink devices mainly include displaying devices; examples of the source devices include STB (Set Top Box), various players for DVD, BD (Blu-ray Disc), etc., and various recorders for DVD, BD, etc.,; and examples of the repeaters include an AV amplifier, etc.

The HDMI devices are configured to transmit AV streams and associated data associated with the AV streams via one HDMI cable (see, e.g., Patent Document 1). The associated data includes, for example, a CEC message used for inter-device control and an authentication message used for HDCP (High-bandwidth Digital Content Protection) authentication and is mutually exchanged between devices in parallel with the transmission. of AV streams.

PRIOR ART DOCUMENTS

Patent Documents

Patent Document 1: Japanese Laid-Open Patent Publication No. 2008-283469

Nonpatent Document

Nonpatent Document 11: High-Definition Multimedia Interface Specification Version 1.3a, Nov. 10, 2006

SUMMARY OF THE INVENTION

Problems to be Solved by the Invention

It is recently attempted to wirelessly transmit video/audio and associated data associated therewith between devices compatible with the HDMI standard. Such a wireless transmission system uses limited resources (including CPU, transmission band, etc.) of wireless transmitter/receiver to execute a wireless transmission processing of video/audio and associated data.

In the case of wireless transmission, a band is generally limited and errors are often included due to wireless characteristics. Particularly, because a band is preferentially assigned to video/audio, only a narrow band is assigned to the associated data such as format information and control information associated with video/audio, resulting in higher probability of occurrence of transmission error.

Since all the associated data are conventionally equally handled regardless of characteristics of the associated data, for example, the associated data for which transmission rate is important and some data dropouts are acceptable and the associated data for which transmission rate is not so important but data dropouts are unacceptable are transmitted in the same transmission mode and, therefore, it is problematic that the efficiency deteriorates and that the associated data cannot correctly be transmitted if an amount of data to be transmitted increases or if a transmission error or data dropout occurs.

The present invention was conceived in view of the situations and it is therefore an object of the present invention to provide a wireless transmission system that enables associated data associated with video/audio to be transmitted in different transmission modes depending on the characteristics thereof in a wireless transmission environment having a narrow transmission band and easily causing a transmission error.

Means for Solving the Problems

To solve the above problems, a first technical means is a wireless transmission system comprising a first wireless communication device connected to a display device; and a second communication device connected to a video output device, the wireless transmission system outputting video and audio from the video output device to the display device by performing wireless communication between the first wireless communication device and the second wireless communication device, wherein the first wireless communication device and/or the second wireless communication device categorize associated data associated with the video and audio depending on the characteristics thereof and transmit the associated data in different transmission modes for respective categories by wireless.

A second technical means is the wireless transmission system of the first technical means, wherein the first wireless communication device and/or the second wireless communication device include buffers for each category of the associated data.

A third technical means is the wireless transmission system of the first technical means, wherein the presence/absence of retransmission and the presence/absence of transmission order rearrangement are differentiated for the transmission modes.

A fourth technical means is the wireless transmission system of the first technical means, wherein the first wireless communication device and/or the second wireless communication device include a plurality of wired transmission lines depending on characteristics of the associated data, and the first wireless communication device and/or the second wireless communication device categorize the associated data for each of the wired transmission lines.

A sixth technical means is the wireless transmission system of the fourth technical means, wherein the display device is connected through HDMI to the first wireless communication device and the video output device is connected through HDMI to the second wireless communication device, a plurality of the wired transmission lines are made up of a TMDS line, a CEC line, a DDC line, and an HPD line of HDMI standard, the associated data includes DIP transmitted through the TMDS line, a CEC message transmitted through the CEC line, an HDCP authentication message transmitted through the DDC line, and a hot plug signal transmitted through the HPD line, and the categories are divided into a first type including the DIP, a second type including the CEC message and the HDCP authentication message, and a third type including the hot plug signal.

A seventh technical means is the wireless transmission system of the sixth technical means, wherein with regard to the DIP, the second wireless communication device categorizes data for adjusting image quality or audio that changes during watching/listening video and audio into the first type and data that changes at the time of switching a video output source into the third type.

An eighth technical means is the wireless transmission system of the sixth technical means, wherein the transmission mode of the first type is a mode in which retransmission and transmission order rearrangement are not performed, the transmission mode of the second type is a mode in which retransmission is performed while transmission order rearrangement is not performed, and the transmission mode of the third type is a mode in which retransmission and transmission order rearrangement are performed, and a mode for updating old associated data before a change in state remaining in a buffer.

Effect of the Invention

According to the present invention, since associated data associated with video/audio can be transmitted in different transmission modes depending on the characteristics thereof in a wireless transmission environment having a narrow transmission band and easily causing a transmission error, an amount of data to be transmitted can be reduced. Even if a transmission error, a data dropout, etc., occur in the associated data, the associated data can correctly be transmitted. The associated data needed to be rapidly transmitted can preferentially be transmitted.

BRIEF DESCRIPTION OF DRAWINGS

FIG. 2 is a diagram of an example of a table that describes categories of associated data and a transmission mode for each category.

FIG. 5 is a diagram for explaining further example of the wireless AV transmission method used in the wireless transmission system according to the present invention.

MODES FOR CARRYING OUT THE INVENTION

Preferred embodiments of a wireless transmission system of the present invention will now be described with reference to the accompanying drawings. Although the following embodiments are described by exemplarily illustrating HDMI devices, the present invention is applicable to wireless devices capable of transmitting video/audio and associated data associated with the video/audio by wireless.

Figure 1:
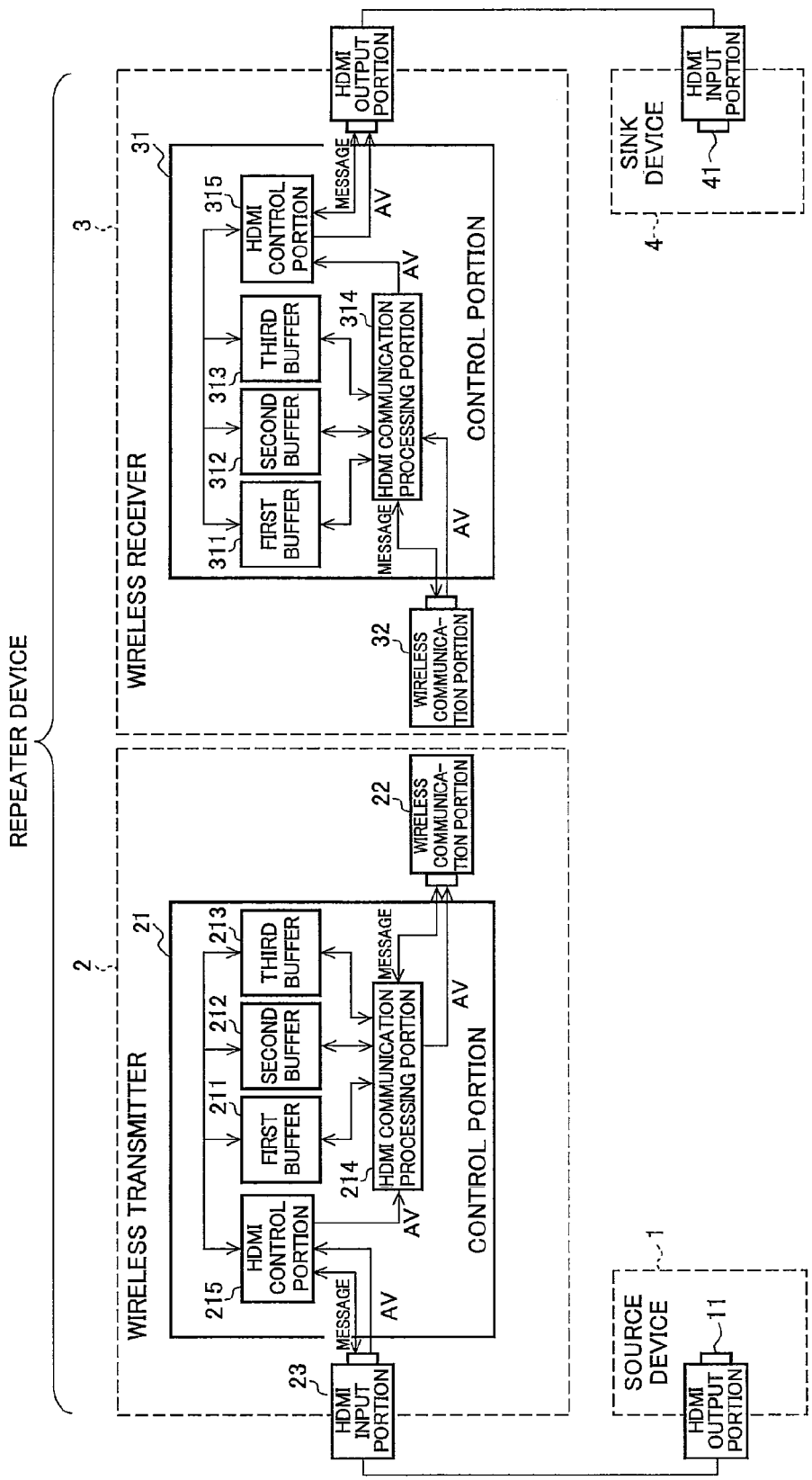
FIG. 1 is a block diagram of an exemplary configuration of a wireless transmission system according to one embodiment of the present invention.

FIG. 1 is a block diagram of an exemplary configuration of the wireless transmission system according to one embodiment of the present invention. In FIG. 1, 1 denotes a source device corresponding to a video output device; 2 denotes a wireless transmitter corresponding to a second wireless communication device; 3 denotes a wireless receiver corresponding to a first wireless communication device; and 4 denotes a sink device corresponding to a display device. The wireless transmitter 2 and the wireless receiver 3 are wirelessly connected and one repeater device is made up of the wireless transmitter 2 and the wireless receiver 3. This wireless transmission system includes the wireless receiver 3 connected through HDMI to the sink device 4 and the wireless transmitter 2 connected through HDMI to the source device 1 and is configured to output video and audio from the source device 1 to the sink device 4 by performing wireless communication between the wireless transmitter 2 and the wireless receiver 3.

Although the first wireless communication device and the second wireless communication device of the present invention are devices capable of wireless transmission and reception, the first wireless communication device and the second wireless communication device are referred to as the wireless receiver 3 and the wireless transmitter 2, respectively, for the convenience of description.

Transmission side devices made up of the source device 1 and the wireless transmitter 2 will first be described.

The source device 1 may be any device capable of outputting video and audio and may be a tuner device such as STB, various recorders and players for BD, DVD, etc., and a game device, for example. Although the source device 1 includes constituent elements for implementing functions as a video output device, these elements will not be described.

In FIG. 1, the source device 1 includes an HDMI output portion 11 and is connected through HDMI to the wireless transmitter 2. The HDMI output portion 11 is an HDMI I/F for connecting an HDMI cable. The HDMI cable includes a CEC line that is a bidirectional bus for transmitting a control signal (CEC message) common to the devices.

The HDMI cable also includes a TMDS line for transmitting streams of video/audio signals that are digital signals in a differential manner, a DDC (Display Data Channel) line utilized for transmitting EDID (Extended Display Identification Data) and transmitting an authentication message used for HDCP authentication, an HPD (Hot-Plug Detect) line for transmitting a hot plug signal giving notification that a device is detected, etc., in addition to the CEC line. The EDID includes information about a type of signals processable by a displaying apparatus, information such as resolution of a display panel, and information such as a pixel clock, a horizontal effective period, and a vertical effective period. The EDID is obtained from the video display side (the sink device 4) by the video transmission side (the source device 1) and the video transmission side transmits a video signal adapted to the resolution of a display panel to be used (a display panel of the sink device 4 in this example). The EDID of the sink device 4 may be copied and stored in the wireless transmitter 2 and, in this case, the source device 1 can access the wireless transmitter 2 to obtain the EDID of the sink device 4.

The wireless transmitter 2 is mainly composed of a control portion 21, a wireless communication portion 22, and an HDMI input portion 23. The HDMI input portion 23 is an HDMI I/F for connecting the HDMI cable described above to achieve the HDMI connection with the source device 1 and is connected to the HDMI output portion 11 of the source device 1 via the HDMI cable. The connection through the HDMI cable between the HDMI output portion 11 and the HDMI input portion 23 enables the source device 1 and the wireless transmitter 2 to transmit/receive various messages such as a CEC message and an authentication message.

The control portion 21 is made up of a first buffer 211, a second buffer 212, a third buffer 213, an HDMI communication processing portion 214, and an HDMI control portion 215. The HDMI control portion 215 is connected to the HDMI input portion 23 via an AV (video/audio) line and a message line. The HDMI communication processing portion 214 is connected to the wireless communication portion 22 via an AV line and a message line. In this case, a transmission line of video/audio data is defined as an AV line and a transmission line of other associated data (such as messages and control information) is defined as a message line, instead of classifications in HDMI by TMDS line, CEC line, DDC line, HPD line, and the like.

The wireless communication portion 22 converts video, audio, and messages obtained from the HDMI communication processing portion 214 into a format that can be transmitted by wireless and transmits the converted video, audio, and messages to the wireless receiver 3 by wireless.

Reception side devices made up of the sink device 4 and the wireless receiver 3 will then be described.

The sink device 4 maybe any device capable of displaying video and outputting audio and may be a monitor or a television device with a tuner, for example. Although the sink device 4 includes constituent elements for implementing functions as a display device, these elements will not be described.

In FIG. 1, the sink device 4 includes an HDMI input portion 41 and is connected through HDMI to the wireless receiver 3. The HDMI input portion 41 is an HDMI I/F for connecting an HDMI cable. The HDMI input portion 41 connects the lines (the CEC line, the TMDS line, the DDC line, and the HPD line) included in the HDMI cable as is the case with the source device 1.

The wireless receiver 3 is mainly composed of a control portion 31, a wireless communication portion 32, and an HDMI output portion 33. The HDMI output portion 33 is an HDMI I/F for connecting the HDMI cable described above to achieve the HDMI connection with the sink device 4 and is connected to the HDMI input portion 41 of the sink device 4 via the HDMI cable. The connection through the HDMI cable between the HDMI input portion 41 and the HDMI output portion 33 enables the sink device 4 and the wireless receiver 3 to transmit/receive various messages such as a CEC message and an authentication message.

The control portion 31 is made up of a first buffer 311, a second buffer 312, a third buffer 313, an HDMI communication processing portion 314, and an HDMI control portion 315. The HDMI control portion 315 is connected to the HDMI output portion 33 via an AV (video/audio) line and a message line. The HDMI communication processing portion 314 is connected to the wireless communication portion 32 via an AV line and a message line.

A main characteristic of the present invention is to transmit associated data associated with video/audio in different transmission modes depending on the characteristics thereof in a wireless transmission environment having a narrow transmission band and easily causing a transmission error. In this regard, the control portion 21 included in the wireless transmitter 2 and the control portion 31 included in the wireless receiver 3 are configured to perform control such that the associated data associated with video and audio are categorized depending on the characteristics thereof to transmit the associated data in a different transmission mode for each category by wireless. Specifically, the control portion 21 and the control portion 31 provide the buffers (the first buffer to the third buffer in this example) for respective categories of the associated data and differentiate the presence/absence of retransmission and the presence/absence of transmission order rearrangement for the transmission modes of the associated data.

FIG. 2 is a diagram of an example of a table that describes categories of associated data and a transmission mode for each category. This table is stored in memories (not depicted) provided in the control portion 21 and the control portion 31 and the HDMI control portion 215 and the HDMI control portion 315 refer to the table as needed. In this example, the associated data is categorized into three types depending on the characteristics thereof. The type 1 includes the data which needs a high transmission rate but allows the certainty of transmission to be low, and the transmission mode is represented as "retransmission: no" and "transmission order rearrangement: no". The type 2 includes the data which does not need a high transmission rate but needs a high certainty of transmission (transmission is performed certainly in sequence), and the transmission mode is represented as "retransmission: yes" and "transmission order rearrangement: no". The type 3 includes the data which does not need a high transmission rate but needs a high certainty of transmission and allows the old data of the same kind remaining in a queue (buffer) to be discarded since only the last value of continuously updated data may be transmitted, and the transmission mode is represented as "retransmission: yes" and "transmission order rearrangement: yes (old information before change in state remaining in queue (FIFO) is discarded)".

With respect to the criteria for determination of the types 1, 2, and 3, for example, the associated data that changes in viewing video and audio is categorized into the type 1; the associated data that relates to commands or procedures for authentication is categorized into the type 2; and the associated data that changes at the time of switching of a video source such as switching into another source device is categorized into the type 3.

Therefore, the data is categorized into the type 1 when the transmission rate is important. The data categorized into type 1 is repeatedly transmitted at regular intervals from the transmission side regardless of the presence of change and no acknowledgement (ACK) is returned from the reception side. After the data is received, a necessary processing is performed on the reception side if a state has changed based on the reception data. The data categorized into the type 1 has a limited transmittable data amount and a higher update frequency at a certain data rate and corresponds to state information that changes in synchronization with video/audio such as sound volume (volume) information and audio/video mute control information included in DIP (Data Island Packet), for example.

The data is categorized into the type 2 when the transmission rate is not important and the data must entirely be transmitted. The data is stored in a queue (FIFO) on the transmission side and transmitted in sequence when the transmission can be performed, and if no acknowledgement (ACK) is returned from the reception side, the corresponding and subsequent data are retransmitted. After the data is received, ACK is returned from the reception side to the transmission side and processing that corresponds to the received data is executed. The data categorized into the type 2 does not permit the rearrangement of the order and a data dropout and includes a CEC message (CEC), an HDCP authentication message, EDID (DDC), and wireless communication control information between a wireless transmitter and a wireless receiver, for example. However, EDID is device information and basically unchanged and therefore may be categorized into the type 3.

The data is categorized into the type 3 when the transmission rate is not important and only a notification of state is necessary. As is the case with the type 2, the data is stored in a queue (FIFO) on the transmission side and transmitted in sequence when the transmission can be performed, and if no acknowledgement (ACK) is returned from the reception side, the corresponding and subsequent data are retransmitted. A difference from the type 2 is in that if data of the same kind already exists in a queue on the transmission side, old data is replaced with new data and the old data is discarded. After the data is received, ACK is returned from the reception side to the transmission side and processing that corresponds to the received data is executed. Although ACK and retransmission are necessary as is the case with the type 2, when a video source is switched and data is changed, the data of the same kind not completely transmitted is always overwritten and discarded and, therefore, an overall data transmission amount is reduced as compared to the type 2. The type 3 includes video/audio format information, light control information, color correction information (DIP), and a hot plug signal (HPD), for example. DIP is information that is periodically transmitted regardless of the presence of change in HDMI as is the case with the type 1 and, if a state is retained on the transmission side and the reception side and only a changing point is transmitted as the type 3, a communication amount through a wireless section can considerably be reduced.

Types of categories will hereinafter specifically be described for associated data (messages) transmitted through the CEC line, the TMDS line, the DDC line, and the HPD line of HDMI.

The CEC line is used for transmitting CEC messages that are various control commands used for device coordination of HDMI (e.g., remote controller signals, power on/off signals, and input switch signals) and CEC messages for transmitting information specific to devices, for example, information of reception strength in the case of the wireless mode. Since the transmission must be performed certainly in sequence, these messages are categorized into the type 2.

The wireless transmitter and the wireless receiver exchange the wireless communication control information and the statuses of the transmitter and the receiver as well as various parameters of reception electric power, quality, etc., for the wireless control. These pieces of information are categorized in to the type 2 since the wireless communication between the transmitter and the receiver is mismatched unless the transmission is performed in sequence.

The TMDS line is used for transmitting video/audio and DIP. Audio and DIP are transmitted during a blanking period of video. The DIP mainly transmits data associated with video/audio such as resolution information and content protection information, can transmit a vendor-defined frame, and can also transmit average brightness information, audio parameters, etc. If DIP is set to a register at the implementation level on the transmission side, the DIP is transmitted for each frame and can be read out on the reception side when the DIP arrives.

There are two main types of DIP (the types 1 and 3) from the characteristics of data. For example, backlight control information (information or a control value of brightness for controlling backlight), image quality adjustment processing information (such as OSD display state), audio/video mute control information, sound volume information, and audio valid/invalid information of HDMI (information for preventing abnormal noise from occurring in an invalid section) are categorized into the type 1 because a delay of the transmission affects viewing. For example, a product ID and Vendor Infor-Frame (information dependent on a vendor and not changed) are device information and not changed after connection and are therefore categorized into the type 3, and valid/invalid information of video signals, information related to video adjustment, information related to resolution, content protection information of audio, and color space information are also categorized into the type 3 because these pieces of information are changed at the timing of switching the video source and are not always continuously changed.

The audio valid/invalid information of HDMI and the valid/invalid information of video signals are pieces of information indicative of the valid/invalid states of video and audio output from the transmission side. Therefore, when an invalid signal is received from the transmission side, these pieces of information are used for ignoring the signal on the reception side and this prevents screen disturbance and abnormal noise from occurring due to display/audio output based on invalid data.

The DDC line is used for transmitting EDID and the HDCP authentication message. EDID is device information related to specifications such as information of a format displayable on a display device, is not changed after connection although the transmission must certainly be performed, and is therefore categorized into the type 2 or type 3. The HDCP authentication message is used for exchanging key information in accordance with an authentication sequence based on a protocol having a predetermined procedure, must be transmitted certainly in sequence, and is therefore categorized into the type 2.

The HPD line is used for transmitting the hot plug signal. The hot plug signal gives notification that a device is detected, and is categorized into the type 3 since only the latest state may certainly be transmitted.

The wireless transmitter 2 and the wireless receiver 3 include a plurality of wired transmission lines (the CEC line, the TMDS line, the DDC line, and the HPD line) corresponding to the characteristics of the associated data. In a method of categorizing the associated data by the wireless transmitter 2 and the wireless receiver 3, the associated data can be categorized for each wired transmission line. If a plurality of the associated data having difference characteristics is transmitted through one wired transmission line, the associated data can be categorized based on the header information thereof.

The associated data includes DIP transmitted through the TMDS line, the CEC message transmitted through the CEC line, EDID and the HDCP authentication message transmitted through the DDC line, and the hot plug signal transmitted through the HPD line and is categorized into the type 1 (first type) including DIP, the type 2 (second type) including the CEC message, EDID, and the HDCP authentication message, and the type 3 (third type) including the hot plug signal. With regard to DIP, the data for adjusting image quality or audio changed during watching/listening video and audio is categorized into the type 1 and the data changed at the time of switching a video output source is categorized into the type 3. The EDID may be categorized into the type 3.

In FIG. 1, in the wireless transmitter 2, the HDMI control portion 215 categorizes the associated data input from the HDMI input portion 23 based on the transmission line, the header information, and the table depicted in FIG. 2, stores the associated data categorized into the type 1 in the first buffer 211, stores the associated data categorized into the type 2 in the second buffer 212, and stores the associated data categorized into the type 3 in the third buffer 213. When transmitting the associated data stored in the buffers to the wireless receiver 3 by wireless, the HDMI communication processing portion 214 may add type identification information for identifying the type to the header etc., of the associated data. When receiving the associated data from the wireless transmitter 2, the wireless receiver 3 stores the associated data of the type 1 into the first buffer 311, stores the associated data of the type 2 into the second buffer 312, and stores the associated data of the type 3 into the third buffer 313, based on the type identification information added to the header. If the type 2 and the type 3 are implemented such that the difference only exits in handling of a queue at the time of transmission, a reception buffer can be shared between the type 2 and the type 3 on the reception side.

In this way, the wireless transmitter 2 executes a transmission processing in accordance with a protocol corresponding to the type and the wireless receiver 3 executes a reception processing in accordance with a protocol corresponding to the type.

Although the description has been made of the case that the associated data is wirelessly transmitted from the wireless transmitter 2 to the wireless receiver 3 in the example, EDID is data transmitted from the wireless receiver 3 to the wireless transmitter 2 by wireless, and the CEC message is mutually exchanged between the wireless receiver 3 and the wireless transmitter 2, for example. Therefore, the same processing can obviously be executed in the case of transmitting the associated data from the wireless receiver 3 to the wireless transmitter 2 by wireless. The transmission channels provided by these protocols can also be used not only for the associated data of connected HDMI but also for categorizing communication of control information between wireless devices in the same way.

Figure 3:
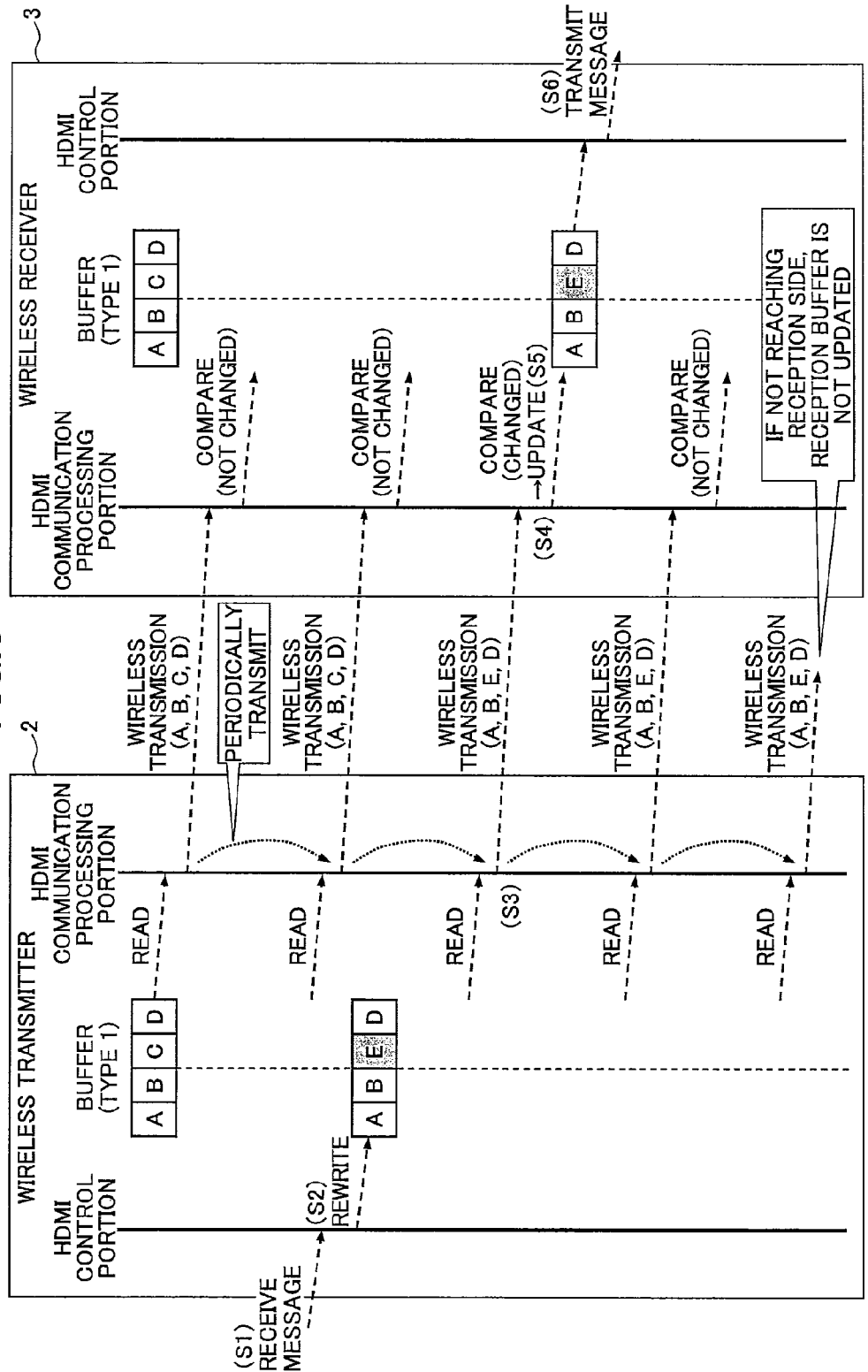
FIG. 3 is a diagram for explaining an example of a wireless AV transmission method used in the wireless transmission system according to the present invention.

FIG. 3 is a diagram for explaining an example of a wireless AV transmission method used in the wireless transmission system according to the present invention. This example explains a sequence example when the associated data (hereinafter, a message) of the type 1 is transmitted by wireless based on the system configuration of FIG. 1. On the transmission side, the first buffer 211 stores "A, B, C, D" as a message of the type 1. The HDMI communication processing portion 214 reads the message "A, B, C, D" from the first buffer 211 and the wireless communication portion 22 periodically wirelessly transmits this message to the wireless receiver 3. The message received from the transmission side is compared with a message of the type 1 stored in the first buffer 311 on the reception side and, if not changed, the message in the first buffer 311 is retained without change.

In the wireless transmitter 2, when receiving a message categorized into the type 1 from the source device 1 (S1), the HDMI control portion 215 identifies and rewrites a relevant message of the same kind in the message "A, B, C, D" stored in the first buffer 211 (S2). In this example, it is assumed that data "C" is rewritten into data "E". The HDMI communication processing portion 214 reads a message "A, B, E, D" from the first buffer 211 (S3) and the wireless communication portion 22 periodically transmits this message to the wireless receiver 3 by wireless.

In the wireless receiver 3, the HDMI communication processing portion 314 receives through the wireless communication portion 32 the message "A, B, E, D" transmitted from the wireless transmitter 2 (S4), and the HDMI communication processing portion 314 compares the message received from the wireless transmitter 2 with a message stored in the first buffer 311 and updates the message if change exists (S5). In this example, since the message "A, B, E, D" is received from the wireless transmitter 2 and the message stored in the first buffer 311 is "A, B, C, D", the message has been changed and, therefore, the contents of the first buffer 311 are updated. The HDMI control portion 315 transmits the message "A, B, E, D" updated/stored in the first buffer 311 via the HDMI output portion 33 to the sink device 4 (S6).

If a message that is transmitted by wireless from the transmission side does not reach the reception side, the buffer on the reception side is not updated in this example; however, the transmission is performed regardless of the presence of change and, therefore, the both buffers are synchronized when the message arrives next time.

Figure 4:
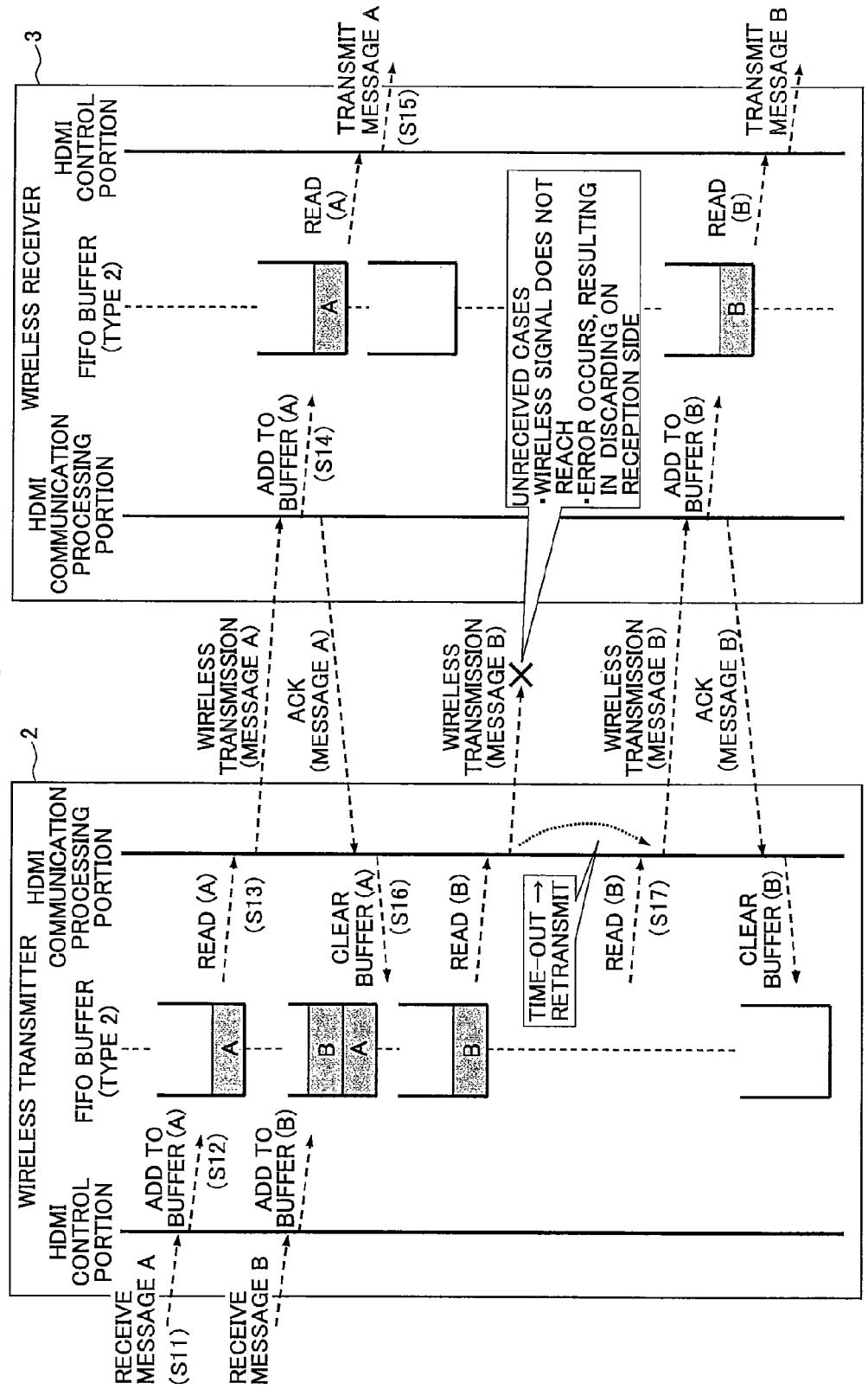
FIG. 4 is a diagram for explaining another example of the wireless AV transmission method used in the wireless transmission system according to the present invention.

FIG. 4 is a diagram for explaining another example of the wireless AV transmission method used in the wireless transmission system according to the present invention. This example explains a sequence example when messages of the type 2 are wirelessly transmitted based on the system configuration of FIG. 1. In this example, it is assumed that the first to third buffers included in the wireless transmitter 2 and the wireless receiver 3 are FIFO buffers.

In the wireless transmitter 2, when receiving messages A, B categorized into the type 2 in series from the source device 1 (S11), the HDMI control portion 215 adds these messages A, B into the second buffer 212 in the order of reception (S12). The HDMI communication processing portion 214 reads the earlier received message A from the second buffer 212 (S13) and the wireless communication portion 22 wirelessly transmits this message A to the wireless receiver 3.

In the wireless receiver 3, the HDMI communication processing portion 314 receives through the wireless communication portion 32 the message A transmitted from the wireless transmitter 2 (S14), and the HDMI communication processing portion 314 stores the message A received from the wireless transmitter 2 into the second buffer 312 and transmits "ACK" for the message A by wireless to the wireless transmitter 2. The HDMI control portion 315 transmits the message A stored in the second buffer 312 via the HDMI output portion 33 to the sink device 4 (S15).

In the wireless transmitter 2, when receiving via the wireless communication portion 22 the "ACK" transmitted from the wireless receiver 3, the HDMI communication processing portion 214 determines that the transmission of the message A is completed, and clears the message A stored in the second buffer 212 (S16).

The HDMI communication processing portion 214 reads the message B from the second buffer 212 and the wireless communication portion 22 transmits this message B by wireless to the wireless receiver 3. If determining that "ACK" for the message B is not received from the wireless receiver 3 for a certain period, for example, if the message B does not reach the reception side or if an error occurs and the message B is discarded on the reception side, the HDMI communication processing portion 214 determines that a time-out occurs, and reads the message B again from the second buffer 212 to retransmit the message B to the wireless receiver 3 (S17).

As is the case with the message A, in the wireless receiver 3, the HDMI communication processing portion 314 receives through the wireless communication portion 32 the message B transmitted from the wireless transmitter 2 and the HDMI communication processing portion 314 stores the message B received from the wireless transmitter 2 into the second buffer 312 and transmits "ACK" for the message B by wireless to the wireless transmitter 2. The HDMI control portion 315 transmits the message B stored in the second buffer 312 via the HDMI output portion 33 to the sink device 4.

In the wireless transmitter 2, when receiving via the wireless communication portion 22 the "ACK" transmitted from the wireless receiver 3, the HDMI communication processing portion 214 determines that the transmission of the message B is completed, and clears the message B stored in the second buffer 212. ACK may be implemented as an independent message or may be transmitted in association with a real communication message for the sake of efficiency. ACK may be implemented so as to correspond one-to-one to a message, or may be implemented such that one ACK can serve as ACK for a plurality of messages.

FIG. 5 is a diagram for explaining further example of the wireless AV transmission method used in the wireless transmission system according to the present invention. This example explains a sequence example when messages of the type 3 are transmitted by wireless based on the system configuration of FIG. 1. It is assumed that the first to third buffers included in the wireless transmitter 2 and the wireless receiver 3 are FIFO buffers.

In the wireless transmitter 2, when receiving messages A, B, C categorized into the type 3 in series from the source device 1 (S21), the HDMI control portion 215 adds these messages A, B, C to the third buffer 213 in the order of reception (S22). The HDMI communication processing portion 214 reads the earlier received message A from the third buffer 213 (S23) and the wireless communication portion 22 wirelessly transmits this message A to the wireless receiver 3.

In the wireless receiver 3, the HDMI communication processing portion 314 receives through the wireless communication portion 32 the message A transmitted from the wireless transmitter 2 (S24), and the HDMI communication processing portion 314 stores the message A received from the wireless transmitter 2 into the third buffer 313 and wirelessly transmits "ACK" for the message A to the wireless transmitter 2. The HDMI control portion 315 transmits the message A stored in the third buffer 313 via the HDMI output portion 33 to the sink device 4 (S25).

In the wireless transmitter 2, when receiving via the wireless communication portion 22 the "ACK" transmitted from the wireless receiver 3, the HDMI communication processing portion 214 determines that the transmission of the message A is completed, and clears the message A stored in the third buffer 213 (S26). The HDMI communication processing portion 214 reads the message B from the third buffer 213 and the wireless communication portion 22 transmits this message B by wireless to the wireless receiver 3. If determining that "ACK" for the message B is not received from the wireless receiver 3 for a certain period, the HDMI communication processing portion 214 determines that a time-out occurs. For example, if the HDMI control portion 215 receives a message B' of the same kind as the message B categorized into the type 3 from the source device 1 during the time-out determination period (S27), the message B stored in the third buffer 213 (not cleared because of unreceived "ACK") is rewritten into the new message B'.

The HDMI communication processing portion 214 reads the message B' from the third buffer 213, and the wireless communication portion 22 transmits this message B' by wireless to the wireless receiver 3.

As is the case with the message A, in the wireless receiver 3, the HDMI communication processing portion 314 receives through the wireless communication portion 32 the message B' transmitted from the wireless transmitter 2 and the HDMI communication processing portion 314 stores the message B' received from the wireless transmitter 2 into the third buffer 313 and wirelessly transmits "ACK" for the message B' to the wireless transmitter 2. The HDMI control portion 315 transmits the message B' stored in the third buffer 313 via the HDMI output portion 33 to the sink device 4.

In the wireless transmitter 2, when receiving via the wireless communication portion 22 the "ACK" transmitted from the wireless receiver 3, the HDMI communication processing portion 214 determines that the transmission of the message B' is completed, and clears the message B' stored in the third buffer 213.

Although the update of the message B' has a risk of clearing the message B' due to the ACK for the message B, the loss of data can be prevented by the implementations such as using information associated with the ACK to allow determination of data to which the ACK corresponds or, more simply, dividing a queue to a transmission processing waiting area and an ACK waiting area (an area for waiting the clearing due to ACK after the transmission processing is executed once) and limiting the overwrite to the transmission processing waiting area.

In the case of the messages categorized into the type 3, a message of the same kind not completely transmitted is directly overwritten unlike the type 2 and, therefore, the old message does not need to be transmitted, thereby reducing a data transmission amount.

According to the present invention, since the associated data associated with video/audio can be transmitted in different transmission modes depending on the characteristics thereof in a wireless transmission environment having a narrow transmission band and easily causing a transmission error, an amount of data to be transmitted can be reduced. Even if a transmission error, a data dropout, etc., occur in the associated data, the associated data can correctly be transmitted. The associated data needed to be rapidly transmitted can preferentially be transmitted.

Since the associated data can be transmitted by using the wireless channel same as the transmission of video and audio, another wireless channel does not need to be added for sending the associated data. Therefore, an antenna, an amplifier, a signal processing portion, etc., are unnecessary for realizing an additional wireless channel and cost reduction can be achieved.

The wireless transmission utilizes a wireless frequency band (5-GHz band) available without the need to obtain a license. Ranges of available frequencies are regulated by law and another wireless device (such as wireless LAN) utilizing the same frequency band (5-GHz band) is arranged to perform communication by searching an unused frequency range (frequency channel) through which no communication is performed. According to the wireless AV transmission method of the present invention, it is not necessary to add frequency range (frequency channel) to be used and, therefore, a frequency range available to another communication device accordingly increases, thereby increasing opportunities for communication.

EXPLANATIONS OF LETTERS OR NUMERALS

1 . . . source device; 2 . . . wireless transmitter; 3 . . . wireless receiver; 4 . . . sink device; 11, 33 . . . HDMI output portion; 21, 31 . . . control portion; 22, 32 . . . wireless communication portion; 23, 41 . . . HDMI input portion; 211, 311 . . . first buffer; 212, 312 . . . second buffer; 213, 313 . . . third buffer;

214, 314 . . . HDMI communication processing portion; and
215, 315 . . . HDMI control portion.

The invention claimed is:

1. A wireless transmission system comprising: a first wireless communication device connected to a display device; and a second communication device connected to a video output device, the wireless transmission system outputting video and audio from the video output device to the display device by performing wireless communication between the first wireless communication device and the second wireless communication device, wherein
   either or both of the first wireless communication device and the second wireless communication device categorize associated data associated with the video and audio into categories depending on the characteristics thereof and transmit the categorized associated data in one of a plurality of different transmission modes according to the respective categories thereof, by wireless, wherein
   either or both of the first wireless communication device and the second wireless communication device include a plurality of wired transmission lines each associated with different characteristics of the associated data, and either or both of the first wireless communication device and the second wireless communication device categorize the associated data for each of the wired transmission lines,
   the display device is connected through High-Definition Multimedia Interface (HDMI) to the first wireless communication device and the video output device is connected through HDMI to the second wireless communication device,
   the plurality of the wired transmission lines are made up of a Transition-Minimized Differential Signaling (TMDS) line, a Consumer Electronics Control (CEC) line, a Display Data Channel (DDC) line, and a Hot-Plug Detect (HPD) line of HDMI standard,
   the associated data includes Dual In-line Package (DIP) data transmitted through the TMDS line, a CEC message transmitted through the CEC line, a High-bandwidth Digital Content Protection (HDCP) authentication message transmitted through the DDC line, and a hot plug signal transmitted through the HPD line,
   the categories are divided into a first category including the DIP, a second category including the CEC message and the HDCP authentication message, and a third category including the hot plug signal, and
   wherein the transmission mode of the first category is a mode in which retransmission and transmission order rearrangement are not performed, the transmission mode of the second category is a mode in which retransmission is performed while transmission order rearrangement is not performed, and the transmission mode of the third category is a mode in which retransmission and transmission order rearrangement are performed, and a mode for updating old associated data before a change in state remaining in a buffer.

2. The wireless transmission system of claim 1, wherein either or both of the first wireless communication device and the second wireless communication device include buffers for each category of the associated data.

3. The wireless transmission system of claim 1, wherein when a plurality of the associated data having different characteristics is transmitted through one wired transmission line, either or both of the first wireless communication device and the second wireless communication device categorize the plurality of the associated data based on header information thereof.

4. The wireless transmission system of claim 1, wherein with regard to the DIP, the second wireless communication device categorizes associated data for adjusting image quality or audio that changes during watching or listening video or audio into the first category and associated data that changes at the time of switching a video output source into the third category.

* * * * *